United States Patent Office 2,898,364
Patented Aug. 4, 1959

2,898,364

METHOD OF MAKING PERFLUORINATED PHOSPHATE ESTERS AND RESULTING NEW CHEMICAL COMPOUNDS

James Carroll Conly, East Paterson, N.J., assignor to Douglas Aircraft Company, Inc., Santa Monica, Calif.

No Drawing. Application October 25, 1954
Serial No. 464,622

5 Claims. (Cl. 260—461)

This invention relates to a method of making certain perfluorinated tri-alkyl phosphate esters represented by the formula $(C_nF_{2n+1})_3PO_4$ in which $n$ is any integer from 3 to 8, that is, the alkyl radicals have from 3 to 8 carbon atoms and other resulting new chemical compounds.

This application is a continuation-in-part of my application Ser. No. 188,264, filed October 3, 1950, now abandoned.

In accordance with my invention described and claimed in my Patent No. 2,727,058 the discovery has been made that the fluorinated and chlorinated phosphate ester represented by the formula $(C_{n-1}F_{2n-1}CCl_2)_3PO_4$ in which $n$ is any integer from 3 to 8 can be made by chlorinating the corresponding phosphate ester represented by the formula $(C_{n-1}F_{2n-1}CH_2)_3PO_4$ in which $n$ is any integer from 3 to 8, and that by this process new chemical compounds can be made represented by the formula $(C_{n-1}F_{2n-1}CCl_2)_3PO_4$ in which $n$ is any integer from 3 to 8.

In accordance with my invention as disclosed and claimed herein I have discovered that from such fluorinated and chlorinated phasphate esters the corresponding perfluorinated phosphate ester can be made, that is, the corresponding phosphate ester with all of the hydrogens of the alkyl groups replaced by fluorination as represented by the formula $(C_nF_{2n+1})_3PO_4$ in which $n$ is any integer from 3 to 8 and that by this method entirely new chemical compounds are produced as represented by this formula. This replacement of the chlorine atoms with fluorine atoms in accordance with my invention is done by an agent effective to make such a substitution such as $CoF_3$, $AgF_2$, $CuF_2$, $SbF_5$, $SbF_3Cl_2$, etc. with or without hydrogen fluoride, in either liquid or gaseous state, and at moderate or elevated temperatures, substantially as known in the art for effecting substitution of fluorine for chlorine in organic compounds. My invention will be illustrated by the following examples:

Example I

Tris-heptafluorobutyl phosphate was first made by the reaction of heptafluorobutyl alcohol with phosphorus oxychloride ($POCl_3$) in the presence of aqueous sodium hydroxide.

21.5 grams of tris-1,1,-dihydro-2,2,3,3,4,4,4-heptafluorobutyl phosphate were dissolved in 100 cc. of carbon tetrafluoride and 16.4 grams of sodium acetate were added to form a slurry-like mixture. The mixture was saturated at 0° C. with chlorine gas and then stirred under an ultra-violet lamp. The reaction required about 45 minutes to remove the chlorine as evidenced by the disappearance of the yellow color. This procedure with the chlorine was carried out until the chlorination was complete. The reaction mixture was filtered and the clear liquid filtrate was distilled. The product was collected at approximately 130–135° C. at 1 millimeter Hg pressure, which is the approximate boiling point of this product. This product was tris-1,1-dichloro-2,2,3,3,4,4,4-heptafluorobutyl phosphate, as determined by analysis.

Example II

The chlorinated phosphate tris-1,1-dichloro-2,2,3,3,4,4,4-heptafluorobutyl phosphate is moved and reacted with $CoF_3$ at a temperature of 280–300° C. with stirring until the reaction of substitution of chlorine with fluorine is complete, as indicated by no further replaceable chlorine. The product is purified to obtain the desired product tris-1,1,2,2,3,3,4,4,4-nonafluorobutyl phosphate.

The products made in accordance with my invention have a high degree of fire-resistance and are capable of imparting a high degree of fire-resistance to other materials or fluids into which incorporated.

The foregoing describes my invention in its preferred aspects, and illustrates my invention by way of specific examples, but alterations and modifications may be made thereof without departing from the invention herein disclosed.

Having described my invention, I claim:

1. The method of making a perfluorinated trialkyl phosphate ester represented by the formula $$(C_nF_{2n+1})_3PO_4$$

in which $n$ is an integer from 3 to 8 which comprises reacting the corresponding fluorinated and chlorinated phosphate ester represented by the formula $$(C_{n-1}F_{2n-1}CCl_2)_3PO_4$$

in which $n$ is an integer from 3 to 8 with a member selected from the group consisting of $CoF_3$, $AgF_2$, $CuF_2$, $SbF_5$ and $SbF_3Cl_2$ until all the chlorine atoms in said ester are replaced with fluorine atoms.

2. The method as defined in claim 1 wherein said perfluorinated trialkyl phosphate ester is 1,1,2,2,3,3,4,4,4-nonafluorobutyl phosphate and said corresponding fluorinated and chlorinated phosphate ester is tris-1,1-dichloro-2,2,3,3,4,4,4-heptafluorobutyl phosphate.

3. The method of making tris-1,1,2,2,3,3,4,4,4-nonafluorobutyl phosphate which comprises fluorinating tris-1,1-dichloro-2,2,3,3,4,4,4-heptafluorobutyl phosphate by reacting with cobalt trifluoride at a temperature of about 280–300° C. until the substitution of chlorine with fluorine is complete.

4. The perfluorinated trialkyl phosphate ester represented by the formula $(C_nF_{2n+1})_3PO_4$ in which $n$ is any integer from 3 to 8.

5. Tris-1,1,2,2,3,3,4,4,4-nonafluorobutyl phosphate.

References Cited in the file of this patent

UNITED STATES PATENTS

| | | |
|---|---|---|
| 2,559,749 | Benning | July 10, 1951 |
| 2,694,083 | Moreton et al. | Nov. 9, 1954 |
| 2,727,058 | Conly | Dec. 13, 1955 |

OTHER REFERENCES

Fluorine Chemistry, vol. I, edited by J. H. Simons (1950), pages 66, 524–525.

UNITED STATES PATENT OFFICE

CERTIFICATE OF CORRECTION

Patent No. 2,898,364                               August 4, 1959

James Carroll Conly

It is hereby certified that error appears in the printed specification of the above numbered patent requiring correction and that the said Letters Patent should read as corrected below.

Column 1, line 37, for "phasphate" read -- phosphate --; column 2, line 12, for "moved" read -- mixed --.

Signed and sealed this 16th day of February 1960.

(SEAL)
Attest:

KARL H. AXLINE                                            ROBERT C. WATSON

Attesting Officer                                        Commissioner of Patents